March 22, 1960  A. BRUEDER  2,929,660
BRAKING SYSTEM FOR AUTOMOTIVE VEHICLES
Filed Feb. 6, 1956  5 Sheets-Sheet 1
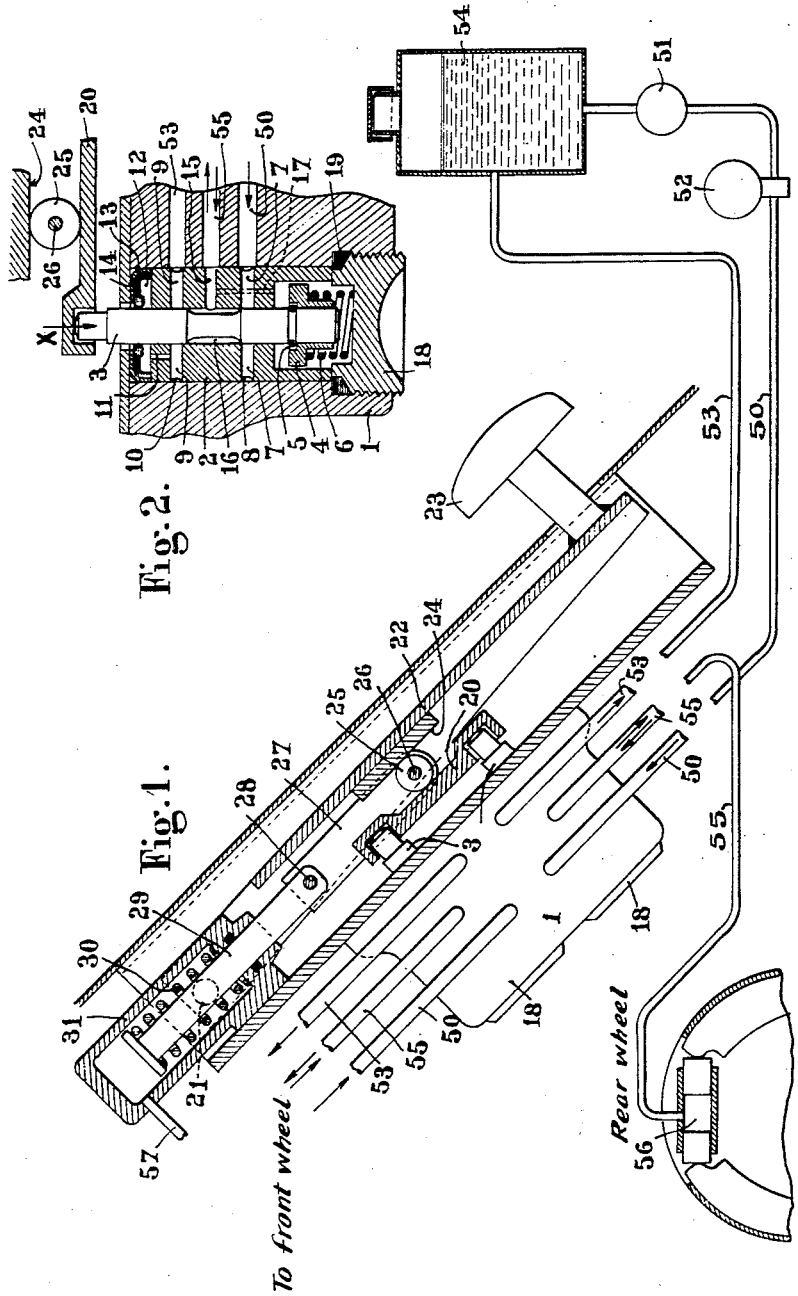

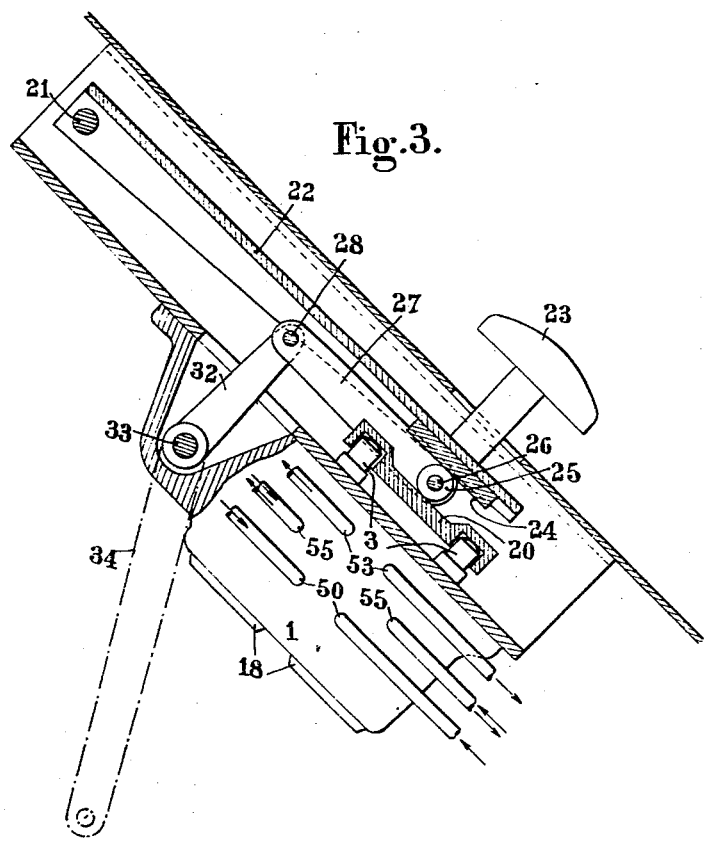

March 22, 1960 A. BRUEDER 2,929,660
BRAKING SYSTEM FOR AUTOMOTIVE VEHICLES
Filed Feb. 6, 1956 5 Sheets-Sheet 3
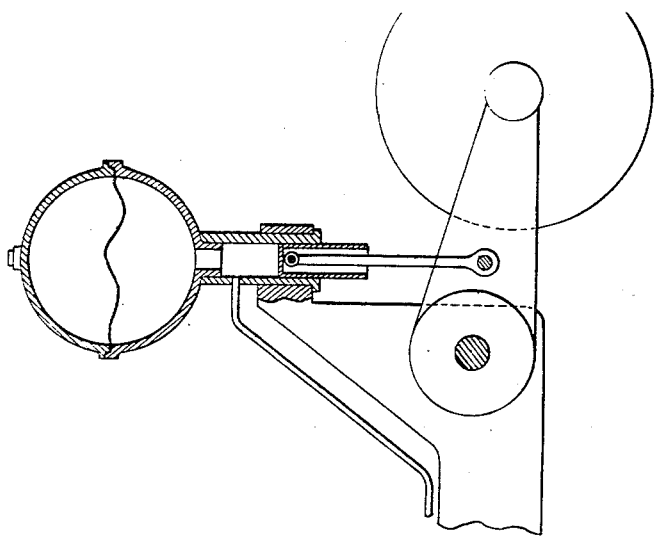
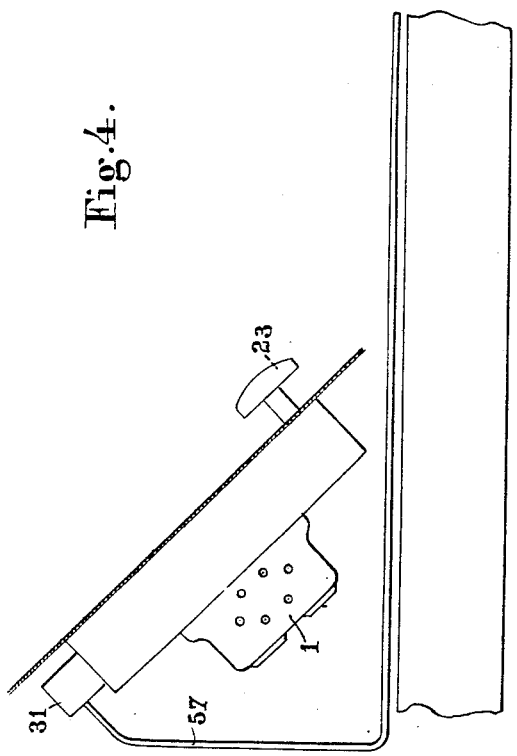
Fig.4.

March 22, 1960 A. BRUEDER 2,929,660
BRAKING SYSTEM FOR AUTOMOTIVE VEHICLES
Filed Feb. 6, 1956
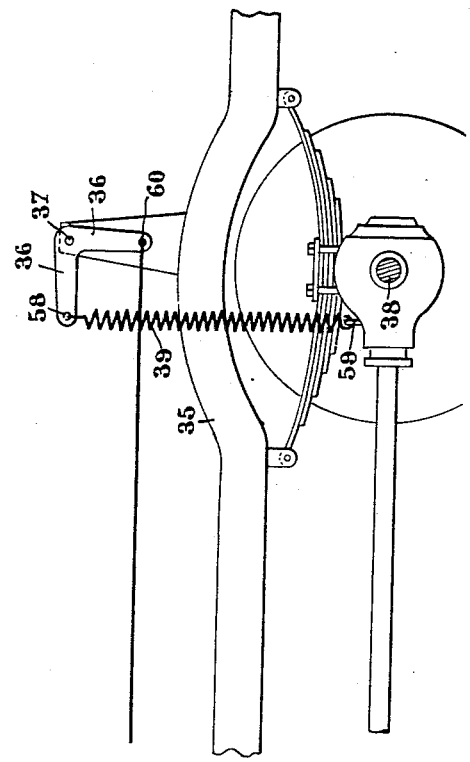
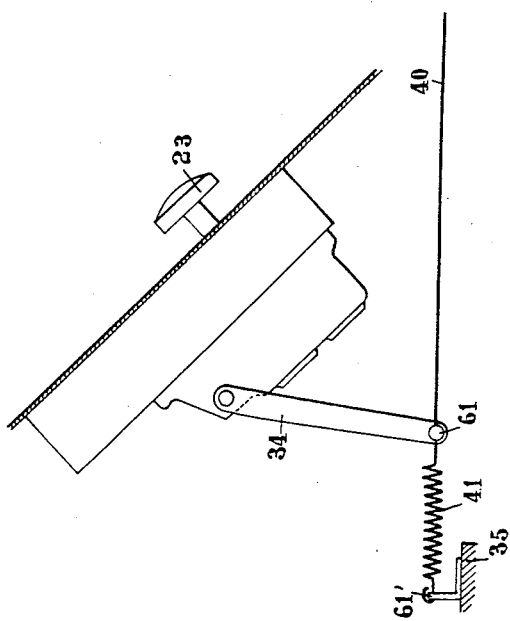
Fig.5.

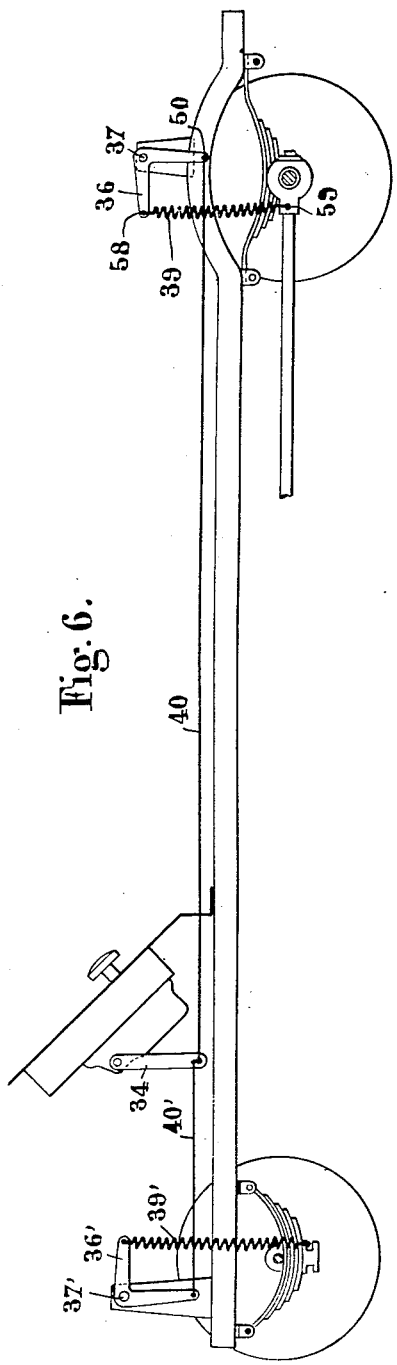

United States Patent Office 2,929,660
Patented Mar. 22, 1960

2,929,660

BRAKING SYSTEM FOR AUTOMOTIVE VEHICLES

Antoine Brueder, Paris, France, assignor to Societe Anonyme Andre Citroen, Paris, France Application February 6, 1956, Serial No. 563,737

Claims priority, application France February 10, 1955

3 Claims. (Cl. 303—22)

This invention relates in general to braking systems of vehicles and has particular reference to a braking system adapted to provide an independent braking action for each axle of the vehicle, from a single and common source of hydraulic energy, the braking force being applied to each axle as a function of the load supported thereby.

The concept of distributing or apportioning the braking force as a function of the load is already known per se. The U.S. Patent No. 2,498,438 patented on February 21, 1950 illustrates an arrangement incorporating a pair of master cylinders interconnected through a swinging link actuated by the brake pedal, the latter acting on this swinging link at a point subordinate to the load of the rear axle as indicated by the sag of the suspension springs.

For the same purpose the U.S. Patent No. 2,490,641 patented on December 6, 1949 provides a method of regulating the braking force as a function of the load supported by the axles by utilizing a device mounted on the hydraulic brake circuit and the automatic operation of which is also controlled as a function of the sag of the suspension springs.

The aforesaid U.S. Patent No. 2,498,438 shows a servo-unit arrangement for vehicles wherein the pressure fluid forced through the brake circuit of each axle is proportioned both to the stroke of the brake pedal and to the load carried by the axle concerned. The load indication is supplied by transmitting the reactions of the suspension springs on the vehicle frame through a pipe line to a piston located in the pressure distributor or master cylinder.

On the other hand, the French First Certificate of Addition filed on March 19, 1951 to the French Patent No. 1,014,251 filed on March 10, 1950, entitled: "Hydraulic Control Device for Braking Systems of Vehicles" describes another solution of this problem whereby a servo-action is obtained through two separate brake circuits with means enabling the ratio of the braking forces distributed to the two circuits to be varied by displacing the point at which the driver's foot pressure is applied to the swinging link interconnecting the two distributors. As contrasted to the solution proposed by the aforesaid U.S. Patent No. 2,490,641, in which the braking force is proportional to the pedal movement with, in addition, a reaction proportional to the pressure transmitted through the brake circuit, in the last-mentioned solution the pedal stroke is very small (about 0.4″) but the reaction is proportional to the braking pressure transmitted to the wheel cylinders.

Now it is the object of this invention to provide a braking system for automotive vehicles, of the type described in the aforesaid French certificate of addition, i.e. comprising two separate brake circuits, or a front-axle system and a rear-axle system, each circuit comprising a unit, consisting for example of a fluid reservoir, a pump and if necessary a fluid accumulator for delivering fluid under pressure; a pressure-regulating distributor, the brake-wheel cylinders transmitting as usual the braking force to the brake shoes; the movable members associated with this distributor and adapted to be actuated by the driver being operatively connected through a swinging link subordinate to the driver's foot pressure, the latter being applied to a point of this swinging link which varies in position as a function of the load supported by the axles.

The device according to this invention is characterized by the provision of means for improving its operation and by the combination into a single, integral unit, of a plurality of members so as to constitute a complete assembly mounted and regulated at the works and adapted to be easily mounted on the vehicle.

According to a first essential feature of this invention the pedal motion is transmitted to the swinging link interconnecting the movable members of the two distributors through a roller adapted to slide axially of this swinging link according to the variations occurring in the load supported by one or each axle.

In the case of a vehicle having a spring suspension system the variations in the load supported by the rear axle cause the aforesaid roller to slide along the swinging link of the double distributor and this roller movement takes place under the control of a mechanical linkage or transmission providing a predetermined ratio of the sag of the suspension springs to the roller displacement.

In the case of a vehicle having a fluid-controlled suspension, for example a hydro-pneumatic suspension system, the roller movements are controlled by a small piston receiving on one face a fluid pressure subordinate to the position of the suspension system and on the other face the reaction of a compression spring of which the characteristics are calculated to achieve the desired result.

According to another feature of this invention, the pair of distributors, the swinging links connecting the movable elements thereof, the roller engaging the aforesaid link, at least the last member controlling the sliding movements of this roller, and the brake pedal, constitute a complete unit at least partly enclosed in a housing adapted to be directly mounted on the vehicle to be equipped with the braking system.

Preferably, the fluid pressure is fed to each distributor through a pair of diametrally opposite ports to balance the reactions on the slide valve therein, so that the apparatus may be constructed with the required high-sensitivity characteristics without resorting to the hitherto customary and elaborate manufacturing methods employed to this end. In certain cases this high sensitivity becomes a source of slide-valve vibration; according to a further feature of this invention, this inconvenience may be avoided by providing at the lower end of the slide valve a spring-loaded piston acting as a vibration damper.

In order to afford a clearer understanding of this invention and of the manner in which the same may be carried out in the practice, reference will now be made to the attached drawings forming part of this specification and illustrating diagrammatically by way of example a few embodiments of the invention. In the drawings:

Figure 1 is a part-sectional, part-elevational view of the double brake distributor with the hydraulic pressure-apportioning and control device;

Figure 2 is an axial sectional view showing the constructional details of a single distributor;

Figure 3 is a part-elevational, part-sectional view of the double distributor wherein the pressure-proportioning device is controlled mechanically;

Figure 4 is a diagrammatical, part-sectional view showing the mounting of the double-distributor system of Fig. 1 on a vehicle equipped with a hydro-pneumatic suspension system; and Figures 5 and 6 illustrate diagrammatically further arrangements for controlling the distribution of the braking force on a vehicle equipped with a leaf-spring suspension system.

Referring now to the drawings and more particularly to Figs. 1 and 2 thereof, the hydraulic-controlled, braking-force apportioning double distributor shown therein consists of a body 1 having formed therethrough a pair of parallel bores in which steel cylinders 2 (Fig. 2) are force fitted; each cylinder 2 has slidably mounted therein a slide valve 3 carrying at its lower end a piston 4 retained by a circlips 5. A compression spring 6 constantly urges the slide valve 3 upwards.

Each cylinder 2 has formed at its lower end a cylindrical bore of a diameter slightly greater than that of the piston 4, and a pair of radial holes 7 are formed above this bore and communicate with each other through a circular groove 8 formed on the outer surface of the cylinder 2 and connected to an inlet passage 50 formed in said body 1 to feed thereto the fluid under pressure delivered by a pump 51 (Fig. 1) through an accumulator 52. Adjacent its upper end each cylinder 2 has also formed therethrough another pair of radial holes 9 communicating through a circular groove 10 with each other and with another passage 53 enabling the fluid to flow back to the reservoir 54. A small orifice 11 connects a chamber 12 formed on top of the cylinder 2 with one of the holes 9, this chamber being closed by a gasket 13 enclosed in a cup-shaped holding member 14.

The slide valve 3 has formed in its intermediate region a relatively wide groove 16 connected through a radial hole 15 formed in the cylinder 2 with one end of a passage 55 having its other end connected through the conventional tubing to the relevant wheel-brake cylinder 56. An orifice 17 connects the radial hole 15 to the bottom bore of the cylinder 2 in which the piston 4 is movable. The lower end of the cylinder is closed by a screw plug 18 associated with a sealing gasket 19.

The slide valves 3 are coupled for dual actuation through a swinging link 20. A brake pedal fulcrumed about a pivot pin 21 consists of a lever 22 carrying a head 23 and having formed at an intermediate location a runway 24. Between this runway 24 and a similar runway formed on the registering face of the link 20 there is provided a roller 25 mounted on a pin 26 secured on a pair of link arms 27 positioned on either side of the longitudinal axis of the apparatus.

In Fig. 1 these link arms are connected through a pin 28 to a piston 29 constantly urged in a direction away from the roller 25 by a calibrated compression spring 30. This piston 29 is movable in a cylinder 31 under the influence of variations in the pressure of a fluid fed to this cylinder through a pipe 57.

In Fig. 3 the pair of link arms 27 are connected through the pin 28 to a lever 32 rigid with a fulcrum pin 33 having secured thereon an external lever 34.

Figure 4 illustrates diagrammatically the operative connection of a double distributor of the type shown in Fig. 1 with a hydro-pneumatic suspension system. This arrangement comprises again the control or master cylinder 31 connected through a line 57 to the suspension cylinder of the rear axle of the vehicle. The pressure developed in the suspension system and therefore in the control cylinder 31 is proportional to the load supported by this axle.

Figure 5 shows by way of example a rear axle equipped with a conventional semi-elliptic leaf spring suspension system.

A pivot pin 37 carried by the vehicle frame has mounted thereon a bell-crank lever 36 having its arm 58 connected through a relatively long traction spring 39 to a point 59 of the axle 38. The other arm 60 of the bell-crank lever 36 is connected through a cable 40 to the outer end 61 of the lever 34, this end 61 of the lever 34 being connected in turn through a traction spring 41 to a fixed point 61' of the frame 35.

The operation of a single distributor is as follows:

Upon depressing the upper end of the slide valve 3 the fluid under pressure fed through the circuit elements 40, 8 and 7 is delivered through the groove 16 to the hole 15 and duct 55 connected to the wheel-brake cylinder 56. At the same time the pressure fluid is fed to the lower end of the slide valve 3 across the orifice 17, thereby moving the slide valve upwards. When the sum of this force and that exerted by the spring 6 becomes slightly greater than the force X representing the downward pressure on the slide valve 3, the latter is moved upwards and disconnects the brake circuit 55 from the pressure fluid inlet 50. If this force X is relatively low the slide valve 3 will continue its upward movement due to the pressure developing in the line 55 and the latter is subsequently connected to the return line 53 and consequently to the reservoir 54.

In Fig. 2 the slide valve 3 is shown in its balanced condition after fluid under pressure has been delivered to the brake circuits. As already explained hereinabove, the braking force is always proportional to the force X exerted on the slide valve 3.

To obtain a high-sensitivity characteristic in the brake fluid distributor of this invention, the component elements thereof must be machined within close tolerance, but an additional requirement is that no unbalanced radial reactions be applied on the slide valve 3. To this end and according to a characteristic feature of this invention a pair of diametrally opposite inlet orifices 7 must be provided.

The high sensitivity of this distributor tends to produce vibration therein under certain operating conditions. This inconvenience is avoided by providing a piston 4 rigid with the slide valve 3 and displaceable therewith to vary the volume of the chamber containing the compression spring 6. This variation will compulsorily occasionate the flow of fluid through the clearance between the piston 4 and the inner wall of the slightly large bore portion of the cylinder 2. Thus, any vibration is damped out by the resulting retarding effect.

The distributor slide vales 3 are interconnected through a link 20 (Figs. 1 and 3). The force applied to the roller 25 by the driver depressing the head 23 of the brake pedal 22 is shared amongst the slide valves 3 with a ratio subordinate to the position of the roller 25 along the link 20. Consequently, the braking force supplied by each distributor is a direct function of this position. Thus, the braking force distribution may be modified by merely displacing the roller 25. When the vehicle is unloaded the position of the roller 25 is determined with a view to provide in the front and rear brake circuits a pressure value whereby these brakes will reach simultaneously the limit of road adhesion. The same applies to a fully-loaded vehicle.

In each case, i.e. whether unloaded or fully loaded, there corresponds either a predetermined pressure in the hydro-pneumatic suspension system (Fig. 4) or a predetermined sag of the suspension springs (Fig. 5). Therefore, it is possible to maintain a constant relationship between the load of the vehicle and the position of the roller by simply calculating the elements through which this pressure or sag is transmitted to the double distributor.

Of course, in the case of loads intermediate the "unloaded" and "fully loaded" conditions, the roller will occupy intermediate positions.

The principle of adjusting the braking pressure or effort distribution to the front and rear axle brakes by considering only the load variations of the rear axle, is theoretically insufficient, but for all practical purposes this method appears to be adequate for most private cars and trucks, since appreciable load variations take place more particularly at the rear. If a more accurate apportioning of the operating effort applied to the brakes is desired, front-axle load variations may be transmitted to the double-distributor device in the manner shown in Fig. 6 illustrating the case of a vehicle having a spring suspension system.

In the case of Fig. 5 the arrangement operates as follows:

Assuming the vehicle to be in its unloaded condition, the traction springs 39 and 41 are balanced and the lever 34 positioned to locate the roller 25 (Fig. 3) as convenient to provide the operating-effort distribution consistent with the unloaded condition of the vehicle. When the vehicle is loaded the suspension springs are deflected and as the point 58 of the bell-crank lever 36 is nearer to the frame 35 the traction spring 39 will be somewhat released or allowed to contract, thereby giving a greater force to the other spring 41 which will thus attract the outer end 61 of lever 34 in the clockwise direction as seen in the figure until the springs 39 and 41 are again balanced. During its aforesaid movement the lever 34 moves the roller 25 away from the fulcrum 21 of the brake pedal 22 (Fig. 3) and as a result the distribution or apportioning of the operating effort amongst the wheel brake cylinders will be altered in that a greater braking force will be applied to the rear brakes.

In the arrangement shown in Fig. 6 it is clear that the vertical movements of the front axle are transmitted to the lever 34 through elements of the same type as those employed at the rear, except that these elements are calculated to be consistent with the flexibility of the front suspension springs, which may differ from that of the rear suspension springs. The spring 41 of Fig. 5 is dispensed with. The cables 40, 40′ are pulled in either direction by springs 39, 39′ attached to the bell-crank levers 36, 36′, thereby balancing automatically the lever 34. Thus, if the rear axle is loaded the spring 39 will be less tensioned and the front control spring 39′ will become preponderant, thereby causing the lever 34 to move in the clockwise direction about its fulcrum and increasing the braking force applied to the rear brakes. If on the other hand it is the front axle that carries a heavier load, the reverse movements and effects will occur. If both axles are loaded simultaneously with a weight proportional to their normal or unloaded weight, both springs 39, 39′ are released simultaneously and if all the elements are properly calculated the lever 34 must not depart from its initial position since the ratio of front braking to rear braking which is now required remains unchanged.

In a vehicle equipped with a hydro-pneumatic suspension system of the general type shown in Fig. 4, it is also possible, by analogy with Fig. 6, to provide a distribution of the braking force which makes due allowance for the load applied on the front axle.

Although a few preferred embodiments of this invention have been shown and described herein, it will be readily understood that they should not be construed as limiting the purpose of the invention as many modifications may be contemplated without departing from the spirit and scope thereof as set forth in the appended claims.

What I claim is:

1. A braking system for the rear axle and the front axle of a vehicle wherein the height of the frame above the rear axle varies with the load carried by the vehicle, said braking system comprising a compressed-liquid distributing installation incorporating a source of compressed liquid and an exhaust, braking means on each axle which are adapted to be actuated by compressed liquid, two distributors connected to said compressed-liquid distributing installation, each distributor comprising a movable operating member adapted on the one hand when released to cause the braking means of one axle to communicate with said exhaust and on the other hand when subjected to a certain thrust to cause said braking means to communicate with said source of compressed liquid until liquid under a pressure which is proportional to said thrust has been transmitted to said braking means, a swinging link fitting over said two operating members of said distributors, a roller engaging said swinging link between said two operating members, a brake pedal adapted when a pressure is exerted on said pedal to depress said roller so as to distribute this pressure among said two movable operating members, a resilient connection between a fixed point of said frame and a fixed point of said axle which is adapted to be elongated when the height of said frame above the rear axle increases, and means connecting one point of said resilient connection to said roller so as to displace said roller on said swinging link between said two operating members and to automatically modify, when a pressure is exerted on said pedal, the distribution of this pressure between the two operating members and consequently the distribution of the braking force among said two axles.

2. A braking system for the two axles of a vehicle wherein the height of the frame above said axles varies with the load carried by the vehicle, said system comprising a compressed-liquid distributing installation incorporating a source of compressed liquid and an exhaust, braking means on each axle which are adapted to be actuated by compressed liquid, two distributors connected to said compressed-liquid distributing installation, each of said distributors comprising a movable operating member adapted on the one hand when released to cause said braking means of one axle to communicate with the exhaust and on the other hand when subjected to a certain thrust to cause said braking means to communicate with said source of compressed liquid until liquid under a pressure which is proportional to said thrust has been transmitted to said braking means, a swinging link fitting over said two operating members of said distributors, a roller engaging said swinging link between said two operating members, a brake pedal adapted when a pressure is exerted thereon to depress said roller so as to distribute this pressure among said two movable operating members according to the position of said roller between said two movable operating members, a resilient connection between said two axles, said resilient connection connected to transmission members pivotally secured on the frame, being adapted to become elongated thereon when the height of the frame above the front and rear axles increases, and other means connecting one point of said transmission member to said roller, to cause said last-mentioned means to displace said roller on said swinging link between said two operating members and bring about automatically, each time a pressure is exerted on said brake pedal, a modification in the distribution of this last-mentioned pressure among said two operating members and consequently of the braking force among said two axles.

3. A braking system as set forth in claim 2, wherein said other means are adapted to keep permanently said roller between said two operating members in a position whereby the ratio of the distance from this roller to the operating member controlling the braking action of one axle to the height of the frame above the same axle has a same value for both axles.

References Cited in the file of this patent
UNITED STATES PATENTS

| | | |
|---|---|---|
| 2,270,366 | Wolf | Jan. 20, 1942 |
| 2,395,671 | Kleinhans et al. | Feb. 26, 1946 |
| 2,498,438 | Levesque Du Rostu | Feb. 21, 1950 |
| 2,538,274 | Jean Baptiste Sanmoni | Jan. 16, 1951 |
| 2,667,181 | Ashton et al. | Jan. 26, 1954 |
| 2,815,042 | Passaggio | Dec. 3, 1957 |

FOREIGN PATENTS

| | | |
|---|---|---|
| 61,598 | France | Nov. 24, 1954 |
| 590,755 | Great Britain | July 28, 1947 |